US010969621B2

(12) United States Patent
Inui (10) Patent No.: US 10,969,621 B2
(45) Date of Patent: Apr. 6, 2021

(54) DISPLAY ASSEMBLY AND DISPLAY DEVICE

(71) Applicant: Sharp Kabushiki Kaisha, Sakai (JP)

(72) Inventor: Yohji Inui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/775,238

(22) Filed: Jan. 28, 2020

(65) Prior Publication Data
US 2020/0241358 A1 Jul. 30, 2020

Related U.S. Application Data

(60) Provisional application No. 62/798,421, filed on Jan. 29, 2019.

(51) Int. Cl.
*G02F 1/335* (2006.01)
*G02F 1/1335* (2006.01)

(52) U.S. Cl.
CPC .... *G02F 1/133528* (2013.01); *G02F 2201/50* (2013.01); *G02F 2202/28* (2013.01)

(58) Field of Classification Search
CPC ... G02F 1/133308; G02F 2001/133314; G02F 2001/133331
See application file for complete search history.

(56) References Cited

U.S. PATENT DOCUMENTS

| 10,345,507 | B2* | 7/2019 | Yuki | G02B 6/0088 |
| 2012/0206669 | A1* | 8/2012 | Kim | G02F 1/1339 |
| | | | | 349/58 |
| 2012/0243091 | A1* | 9/2012 | Amm | G02B 5/3083 |
| | | | | 359/489.07 |
| 2019/0208044 | A1* | 7/2019 | Lee | H01L 27/3227 |
| 2019/0278132 | A1* | 9/2019 | Nakamura | G02F 1/133528 |

FOREIGN PATENT DOCUMENTS

JP 2015038655 A 2/2015

* cited by examiner

*Primary Examiner* — Julie A Bannan
(74) *Attorney, Agent, or Firm* — ScienBiziP, P.C.

(57) ABSTRACT

A display assembly used for a display device includes a substrate, a protective member, and a first polarizing plate. The protective member is configured to protect the substrate. The first polarizing plate is disposed between the substrate and the protective member and configured to add a polarizing effect. The first polarizing plate has a first through hole through which light passes toward a back side of the display assembly. At least one of the substrate and the protective member includes a protruding portion having light transmissivity and protruding toward the first through hole.

21 Claims, 9 Drawing Sheets

DISPLAY ASSEMBLY AND DISPLAY DEVICE

CROSS REFERENCE TO RELATED APPLICATION

This application claims priority from U.S. Provisional Patent Application No. 62/798,421 filed on Jan. 29, 2019. The entire contents of the priority application are incorporated herein by reference.

TECHNICAL FIELD

The technology described herein relates to a display assembly and a display device.

BACKGROUND

It is conventionally known that components such as cameras, various types of sensors and speakers are mounted around the display screens of electronic devices such as smartphones and notebook computers. Japanese Unexamined Patent Application Publication No. 2015-38655 discloses an example of such a technique. The electron device has a camera element provided on a bezel portion surrounding a display device having a display screen. This bezel portion is required to be narrowed to, for example, enlarge the display screen. For example, when the installation position of the camera element is changed to an outer peripheral portion of the display device itself instead of the bezel portion surrounding the display device, there is no need to secure an accommodation place for the camera element in the bezel portion, and hence it is possible to achieve a narrow bezel portion.

However, providing an accommodation space for the camera element in the outer peripheral portion of a conventional liquid crystal display device sometimes degrades imaging quality because of, for example, an insufficient amount of light externally entering the camera element. This is because light externally entering the camera element reaches the camera element through a liquid crystal assembly including a liquid crystal panel, and hence the transmittance of light passing through the liquid crystal assembly decreases.

SUMMARY

The technology described herein is completed based on the basis of situation and has an object to suppress, in a display device having an accommodation space for an external component and a display assembly used for the display device, a decrease in the transmittance of light externally transmitted through the display assembly toward the accommodation space.

A display assembly used for a display device includes a substrate, a protective member configured to protect the substrate, and a first polarizing plate disposed between the substrate and the protective member and configured to add a polarizing effect. The first polarizing plate has a first through hole through which light passes toward a back side of the display assembly. At least one of the substrate and the protective member includes a protruding portion having light transmissivity and protruding toward the first through hole.

A display device includes a display assembly having the configuration described above, and a lighting device disposed on a back side of the display assembly and configured to irradiate the display assembly with light. The lighting device has an accommodation space configured to accommodate an external component. The accommodation space is overlapping the first through hole.

DETAILED DESCRIPTION

First Embodiment

The first embodiment will be described with reference to FIGS. 1 to 3. This embodiment will exemplify a liquid crystal display device (an example of a display device) 10. Note that the X-, Y-, and Z-axes are shown in part of each drawing, and the respective axial directions are common throughout the respective drawings. In addition, the +Z-axis direction and the −Z-axis direction respectively correspond to the front and back sides of the liquid crystal display device 10.

Figure 1:
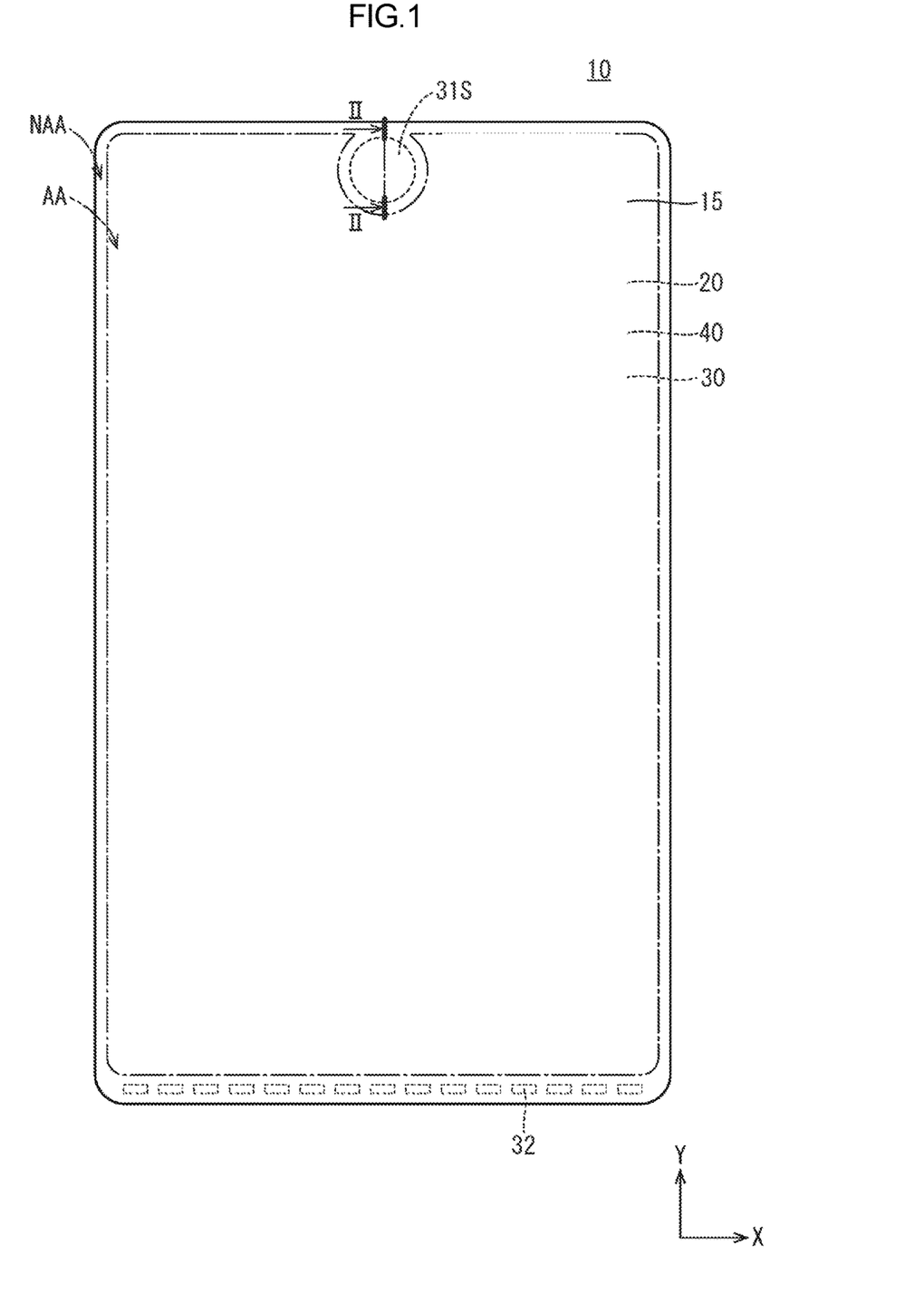
FIG. 1 is a plan view of a liquid crystal display device.

As shown in the plan view of FIG. 1, the liquid crystal display device 10 includes at least a liquid crystal assembly 40 (an example of a display assembly) having a vertically long rectangular shape and including a liquid crystal panel (an example of a display panel) 20 for displaying images and a backlight device (an example of a lighting device) 30 that is disposed on the back side of the liquid crystal assembly 40 and irradiates the liquid crystal assembly 40 (liquid crystal panel 20) with light for display. The liquid crystal display device 10 is mainly used for a portable electronic device such as a smartphone. The screen size of the liquid crystal panel 20 is generally classified as small.

The liquid crystal display device 10 has an accommodation space 31S in part of the outer peripheral portion of the liquid crystal display device 10. The accommodation space 31S is configured to accommodate another electronic device component (hereinafter referred to as an external component) such as a camera element or sensor element. The accommodation space 31S is provided in the backlight device 30 as described later. As shown in FIG. 1, the display screen of the liquid crystal panel 20 is divided in a display area (active area) AA that can display images and is disposed on the central side and a non-display area (nonnative area) NAA that is disposed on the peripheral edge portion so as to surround the display area AA and has a frame-like shape (bezel shape) in a planar view. As the boundary between the respective areas is indicated by the chain line in FIG. 1, the non-display area NAA includes an area overlapping the accommodation space 31S, and part of the display area AA has a curved shape so as to surround the accommodation space 31S.

As shown in FIG. 1, the backlight device 30 is of an edge light type (side light type) based on a one-side light entrance type, which includes, on its end portion, a plurality of LEDs 32 (an example of a light source) arranged in a line. As shown in FIG. 2 (a perspective view taken along line II-II in FIG. 1) and FIG. 3 (a sectional view taken along line II-II in FIG. 1), the backlight device 30 also includes a plate-like light guide plate 36 that light from the LEDs 32 enters, an optical sheet 33 that adds a predetermined optical effect to exit light from the light guide plate 36, a reflecting sheet 37 that reflects leaking light toward the light guide plate 36, and a metal frame 35 that accommodates the LEDs 32, the light guide plate 36, and the like.

The light guide plate 36 is made of an almost transparent synthetic resin material having a higher refractive index than air. As shown in FIGS. 2 and 3, the light guide plate 36 has a plate-like shape and is thicker than the optical sheet 33. The light guide plate 36 receives light emitted from each LED 32 along the Y-axis direction though a side surface and rises the light toward the optical sheet 33 while causing the light to propagate inside, thus causing the light to exit from a front-side surface (light exit plate surface) 36A.

Figure 2:
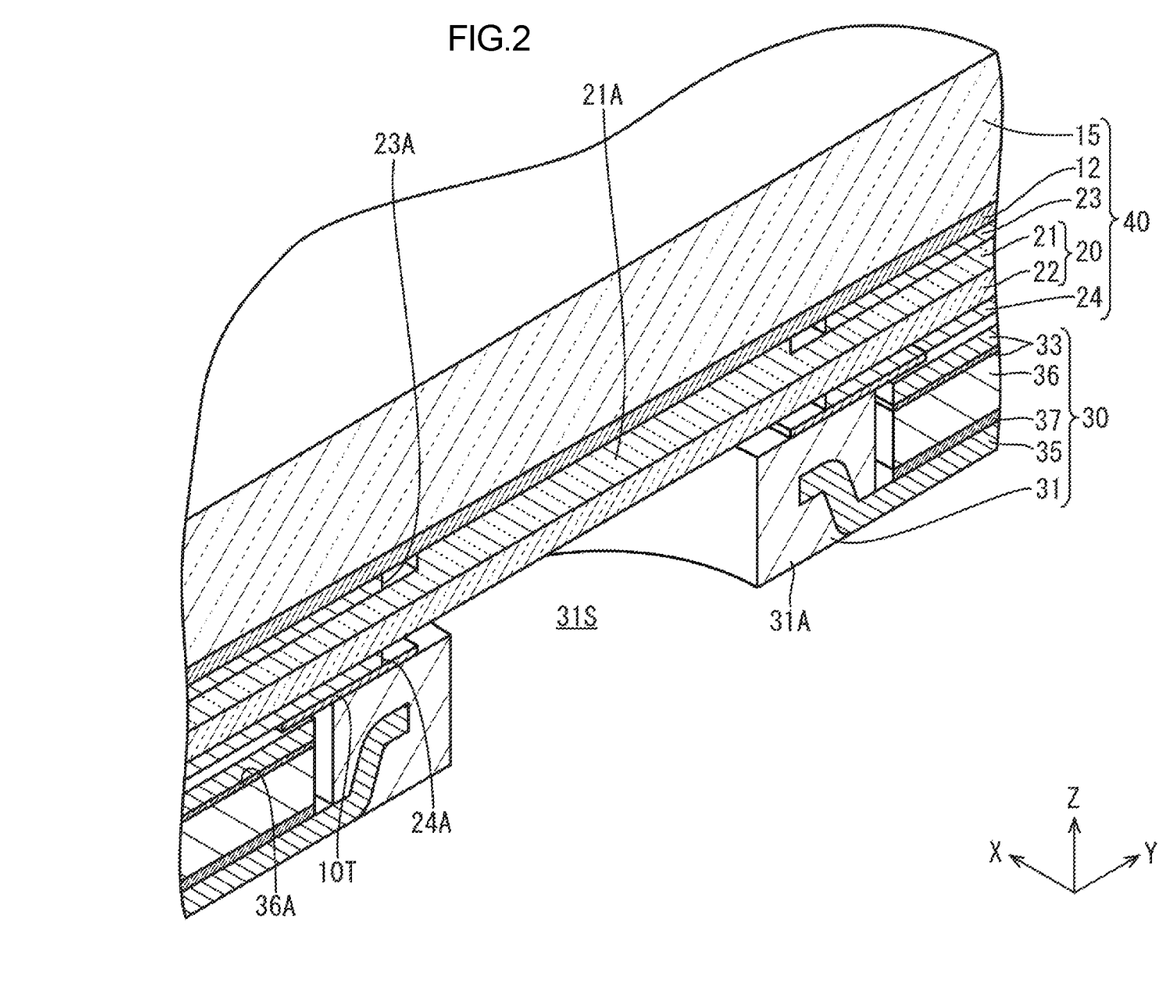
FIG. 2 is a perspective view taken along line II-II in FIG. 1 according to the first embodiment.
Figure 3:
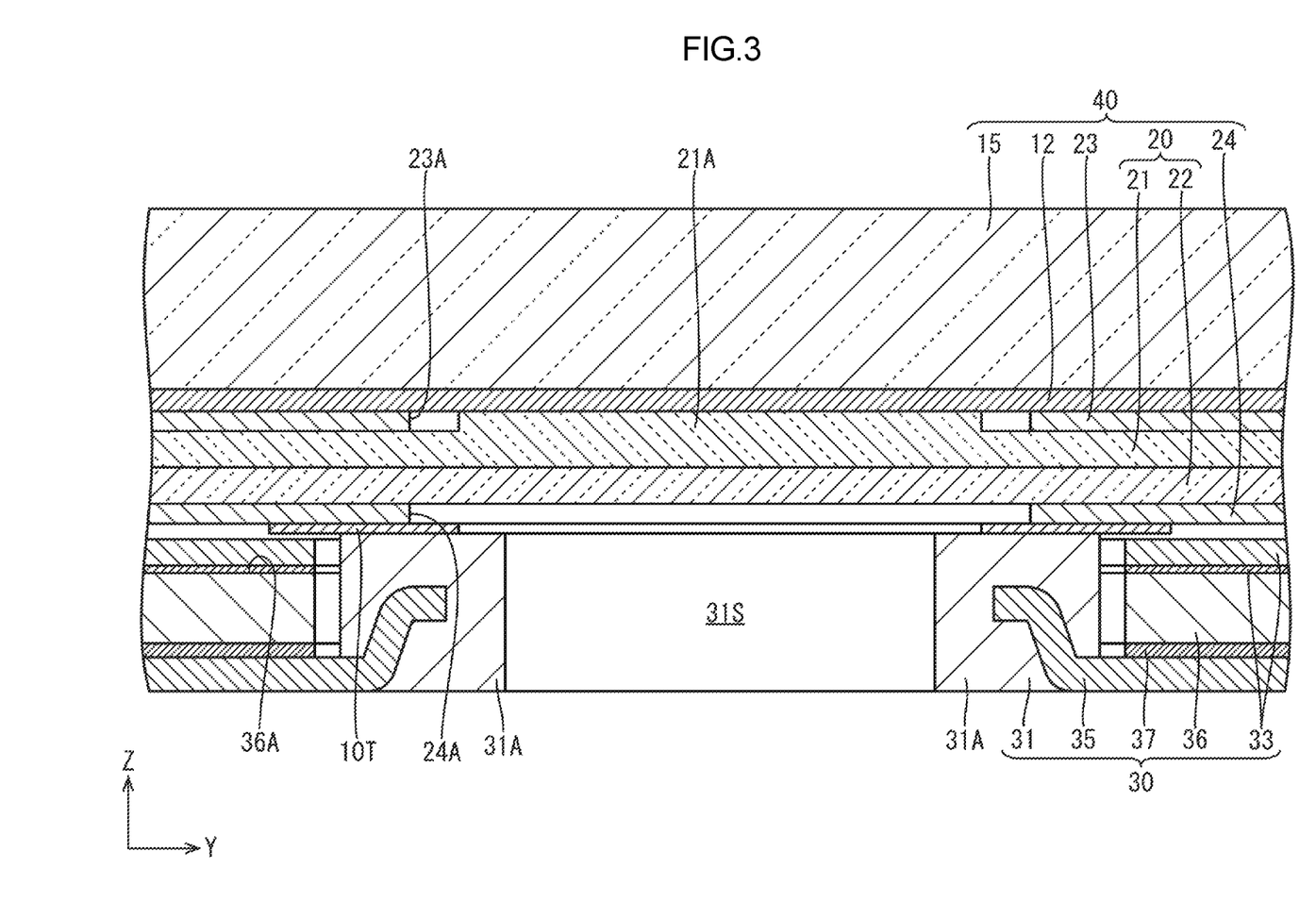
FIG. 3 is a sectional view taken along line II-II in FIG. 1 according to the first embodiment.

As shown in FIGS. 2 and 3, the reflecting sheet 37 is disposed on the back-surface side of the light guide plate 36, and is formed into a synthetic resin sheet, with its surface having a white color exhibiting excellent light reflectivity. The reflecting sheet 37 reflects light leaking from the LEDs 32 or the back surface of the light guide plate 36 toward the light guide plate 36.

As shown in FIGS. 2 and 3, the optical sheet 33 is a sheet formed from a synthetic resin base material and interposed between the liquid crystal panel 20 and the light guide plate 36 to cause exit light from the light guide plate 36 to exit toward the liquid crystal panel 20 while adding a predetermined optical effect to the light. As the optical sheet 33, for example, a diffusion sheet that diffuses light, a lens sheet that adds a focusing effect to light, a wavelength conversion sheet that converts light into light having a different wavelength, or the like can be used. Alternatively, these sheets may be stacked on each other as needed.

The backlight device 30 has the above configuration, with a hole portion 31 having a circular shape in a planar view being provided in part of its outer peripheral portion in this embodiment, as shown in FIGS. 1 to 3. The hole portion 31 is formed from a side wall 31A and an internal space surrounded by the side wall 31A. This internal space is the accommodation space 31S that is configured to accommodate an external component. As shown in FIGS. 2 and 3, the hole portion 31 extends through the backlight device 30 in the Z-axis direction (a direction in which the backlight device 30 opposes the liquid crystal panel 20), and the light guide plate 36, the optical sheet 33, the reflecting sheet 37, and the frame 35 each are formed into a shape excluding the hole portion 31. The hole portion 31 is formed by, for example, cutting the hole portion 31 from each member having a rectangular shape as an original form or being molded in a shape including the hole portion 31. The side wall 31A of the hole portion 31 is made of a metal such as stainless steel or a resin having a high light blocking effect (for example, a black resin) to prevent light from leaking from a light guide plate 60 and the like surrounding the outer peripheral edge of the side wall 31A to the internal space 31S. An annular member serving as the side wall 31A is fixed to an end portion beside the hole portion 31 of the frame 35. As shown in FIGS. 2 and 3, the upper surface of the side wall 31A is fixed to a back polarizing plate 24 with a fixing tape 10T.

The liquid crystal assembly 40 includes the liquid crystal panel 20, a pair of polarizing plates 23 and 24 arranged outside the liquid crystal panel 20, and a cover glass 15 (an example of a protective member) that protects the liquid crystal panel 20 and the like. As shown in FIGS. 2 and 3, the liquid crystal panel 20 includes a pair of substrates 21 and 22, and a liquid crystal layer containing liquid crystal molecules as a material with an optical property that changes accompanying electric field application is sealed in the internal space between the two substrates 21 and 22.

One substrate (array substrate) 22 has switching elements (for example, thin-film transistors) connected to source lines and gate lines perpendicular to each other, pixel electrodes connected to the switching elements, an aligning film, and the like provided on a glass substrate GS as the base material of the one substrate 22. The other substrate (CF substrate) 21 has a color filter with colored portions such as R (red), G (green), and B (blue) portions arranged in a predetermined arrangement, an aligning film, and the like provided on a glass substrate GS as the base material of the other substrate 21. The aligning films and the like are formed on the inside surfaces of the plate surface of the substrates 21 and 22 which face each other, and the polarizing plates 23 and 24 are stacked on the respective outside plate surfaces.

The array substrate 22 is disposed beside the backlight device 30, and the CF substrate 21 is disposed on the front side (the opposite side to the backlight device 30). The polarizing plate disposed on the CF substrate 21 is the front polarizing plate (an example of the first polarizing plate) 23, and the polarizing plate disposed on the array substrate 22 is the back polarizing plate (an example of the second polarizing plate) 24. A first through hole 23A and a third through hole 24A are respectively provided in the front polarizing plate 23 and the back polarizing plate 24 to overlap the accommodation space 31S. The first through hole 23A and the third through hole 24A cause light to be transmitted from the outside (the front side of the liquid crystal assembly 40) to the accommodation space 31S (the back side of the liquid crystal assembly 40) through the liquid crystal assembly 40 to be transmitted through the accommodation space 31S without through the front polarizing plate 23 and the back polarizing plate 24.

As shown in FIGS. 2 and 3, the cover glass 15 is disposed on the front side of the front polarizing plate 23 so as to cover the entire area. The cover glass 15 is made of reinforced glass having high mechanical strength and impact resistance and excellent translucency, and protects the constituent members of the liquid crystal panel 20, such as the substrates 21 and 22. The back surface of the cover glass 15 is bonded to the front surface of the front polarizing plate 23 with an adhesive member 12 such as an optical clear adhesive (OCA) (transparent optical adhesive film) interposed therebetween. As the adhesive member 12, an adhesive agent used in the form of a coating may be used other than an OCA.

As shown in FIGS. 2 and 3, the CF substrate 21 includes a first protruding portion 21A (an example of a protruding portion) protruding toward the first through hole 23A and inserted into the first through hole 23A. This causes light to be transmitted from the outside to the accommodation space 31S through the liquid crystal assembly 40 to be transmitted through the first protruding portion 21A and the accommodation space 31S. The first protruding portion 21A is integrally formed with the glass substrate GS as the base material of the CF substrate 21 and is formed by, for example, leaving the first protruding portion 21A and removing other portions by etching, in the step of producing the glass substrate GS. The height (protrusion height) of the first protruding portion 21A is preferably equal to the depth of the first through hole 23A, that is, the thickness of the front polarizing plate 23.

As described above, the liquid crystal assembly 40 according to this embodiment is used for the liquid crystal display device 10 and includes the CF substrate 21, the cover glass 15 that protects the CF substrate 21, and the front polarizing plate 23 that is disposed between the CF substrate 21 and the cover glass 15 and adds a polarizing effect. The front polarizing plate 23 has the first through hole 23A through light passes toward the back side of the liquid crystal assembly 40. The CF substrate 21 includes the first protruding portion 21A having light transmissivity and protruding toward the first through hole 23A.

Figure 4:
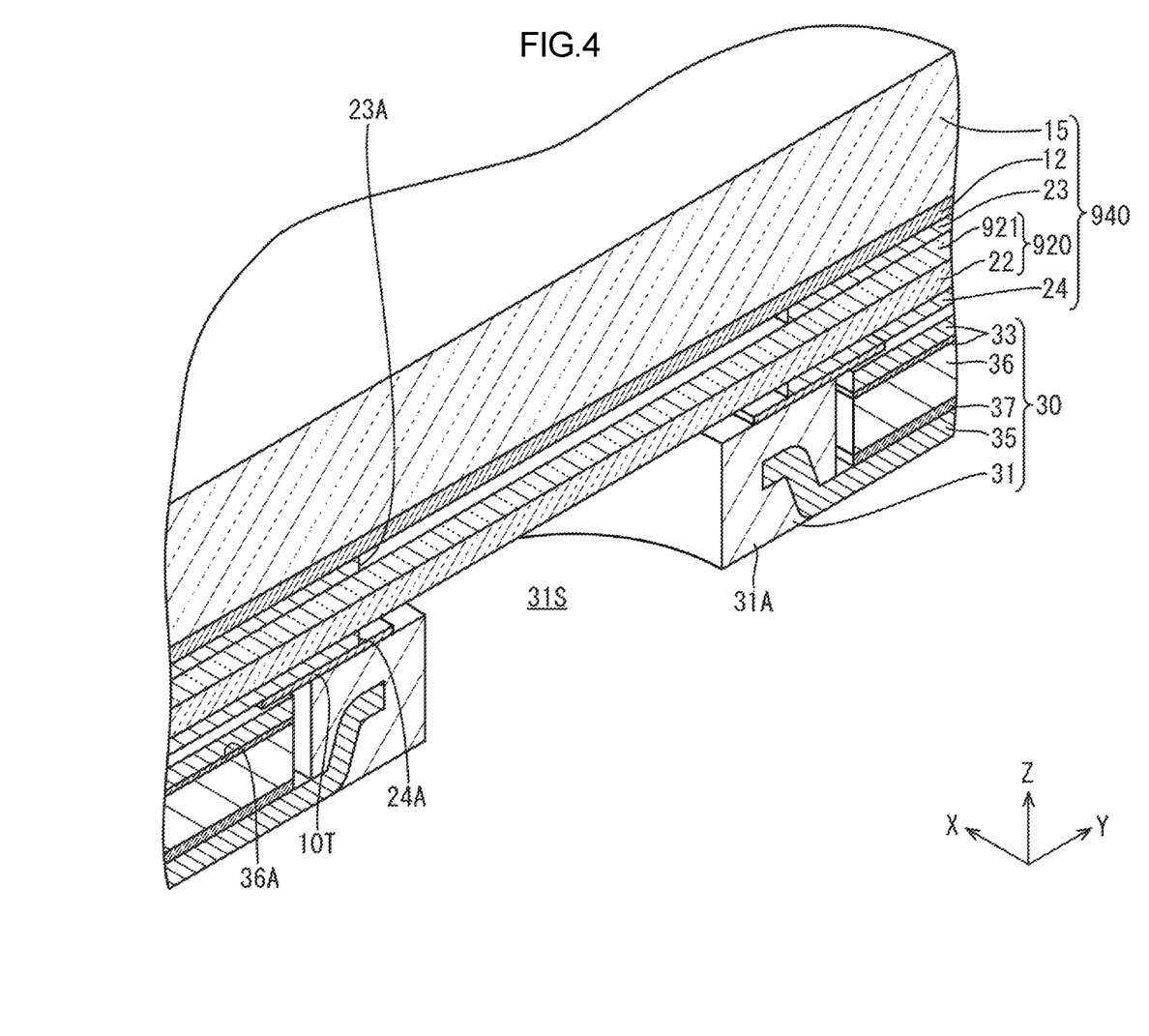
FIG. 4 is a perspective view taken along line II-II in FIG. 1 according to Comparative Example 1.
Figure 5:
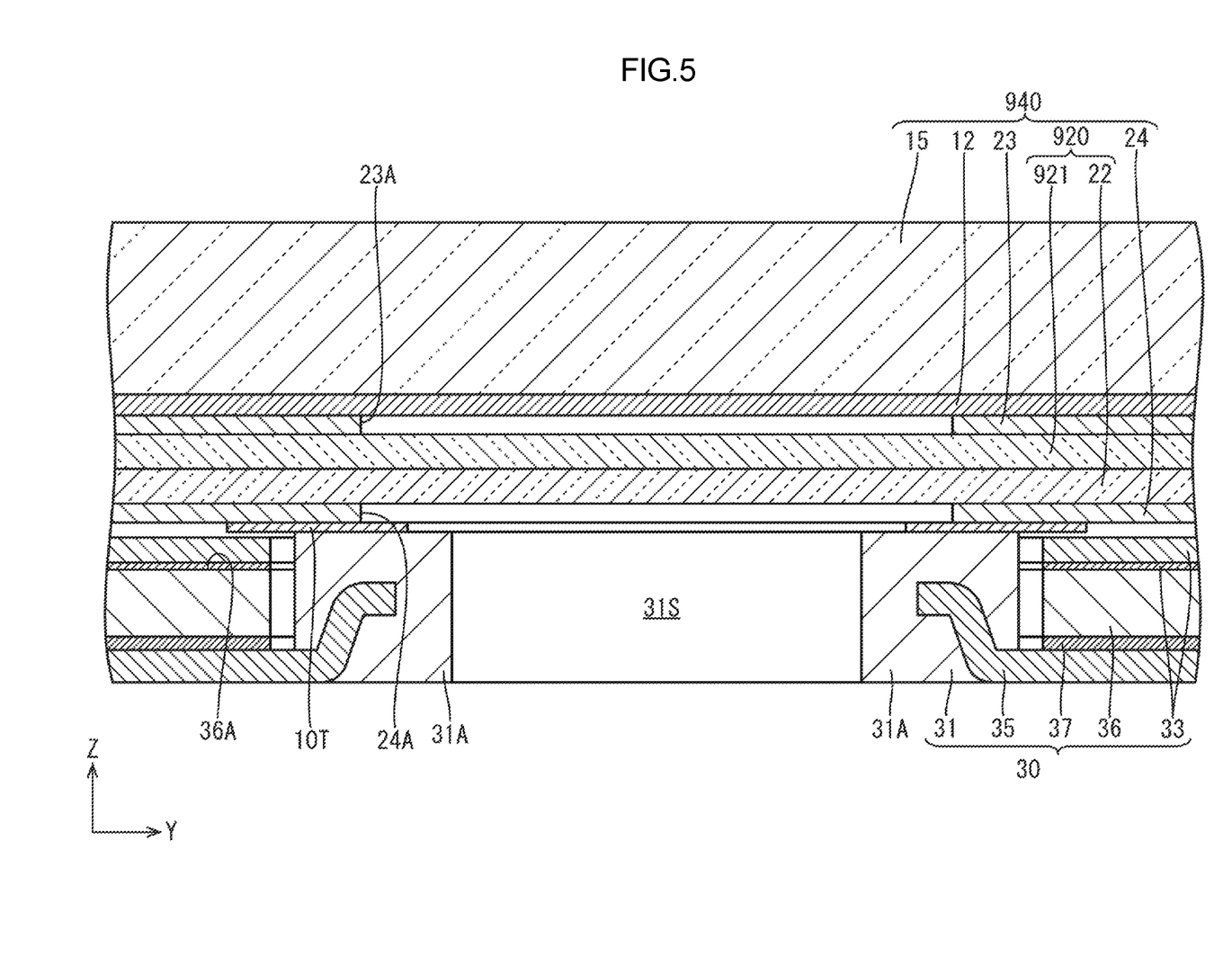
FIG. 5 is a sectional view taken along line II-II in FIG. 1 according to Comparative Example 1.

When the first through hole 23A is provided in the front polarizing plate 23 in this manner, the front polarizing plate 23 has no polarizing effect on light transmitted from the outside (the front side of the liquid crystal assembly 40) to the back side of the liquid crystal assembly 40 (the accommodation space 31S) through the liquid crystal assembly 40 in the first through hole 23A. In this case, as in a liquid crystal assembly 940 according to Comparative Example 1 shown in FIGS. 4 and 5, if only a first through hole 23A is provided but a first protruding portion 21A is not provided on a CF substrate 921 of a liquid crystal panel 920, because the first through hole 23A is filled with an air layer, light transmitted through the first through hole 23A is scattered, resulting in a decrease in light transmittance. In contrast to this, in this embodiment, as shown in FIGS. 2 and 3, providing the first protruding portion 21A having light transmissivity and protruding toward the first through hole 23A causes light transmitted through the first through hole 23A to be transmitted through the first protruding portion 21A. This can suppress a decrease in light transmittance due to an air layer as in Comparative Example 1, and hence allows light to be properly transmitted through the back side of the liquid crystal assembly 40.

The height of the first protruding portion 21A is equal to the thickness of the front polarizing plate 23. This makes the height of the first protruding portion 21A equal to the depth of the first through hole 23A, so that the first protruding portion 21A is inserted into the first protruding portion 21A throughout the total length in the depth direction of the first through hole 23A. Accordingly, light passing through the first through hole 23A need not pass through an air layer. This makes it possible to reliably suppress a decrease in light transmittance.

The first protruding portion 21A is integrally provided with the base material (glass substrate GS) of the CF substrate 21. This facilitates the formation and placement of the first protruding portion 21A having light transmissivity and allows light to propagate with a high transmittance.

The liquid crystal assembly 40 according to this embodiment includes the back polarizing plate 24 disposed on the opposite side of the CF substrate 21 to the cover glass 15 and configured to add a polarizing effect. The back polarizing plate 24 has the third through hole 24A overlapping the first through hole 23A. This prevents light transmitted through the third through hole 24A from receiving a polarizing effect when being transmitted through the back polarizing plate 24, and hence enables light to be properly transmitted through the back side of the liquid crystal assembly 40.

The liquid crystal display device 10 according to this embodiment includes the liquid crystal assembly 40 described above and the backlight device 30 disposed on the back side of the liquid crystal assembly 40 and configured to irradiate the liquid crystal assembly 40 with light. The backlight device 30 has the accommodation space 31S that is configured to accommodate an external component. The accommodation space 31S overlaps the first through hole 23A of the liquid crystal assembly 40.

Providing the backlight device 30 with the accommodation space 31S for an external component (a camera element or the like) in this manner eliminates the necessity to additionally secure an accommodation place for a camera element in the bezel portion of a smartphone or the like when the liquid crystal display device 10 is mounted on the smartphone, thereby achieving a narrower bezel. As described above, the liquid crystal assembly 40 is configured to properly pass light toward the back side of the liquid crystal assembly 40. This causes light with a high transmittance to enter the accommodation space 31S overlapping the first through hole 23A of the liquid crystal assembly 40. As a result, assuming that light enters at a high transmittance of, for example, 90% or more, when a camera element is accommodated as an external component in the accommodation space 31S, high imaging quality can be achieved. In addition, when, for example, an optical sensor element is accommodated as an external component, high detection sensitivity can be achieved.

The accommodation space 31S is formed from an internal space of the hole portion 31 extending through the backlight device 30. This facilitates the work of accommodating an external component in the accommodation space 31S.

Second Embodiment

A liquid crystal assembly 140 according to the second embodiment of the technology described herein will be described with reference to FIGS. 6 and 7. According to the second embodiment, an adhesive member 112 has a second through hole 112A. Note that redundant descriptions concerning the same structure, function, and effect as those of the first embodiment described above will be omitted.

Figure 6:
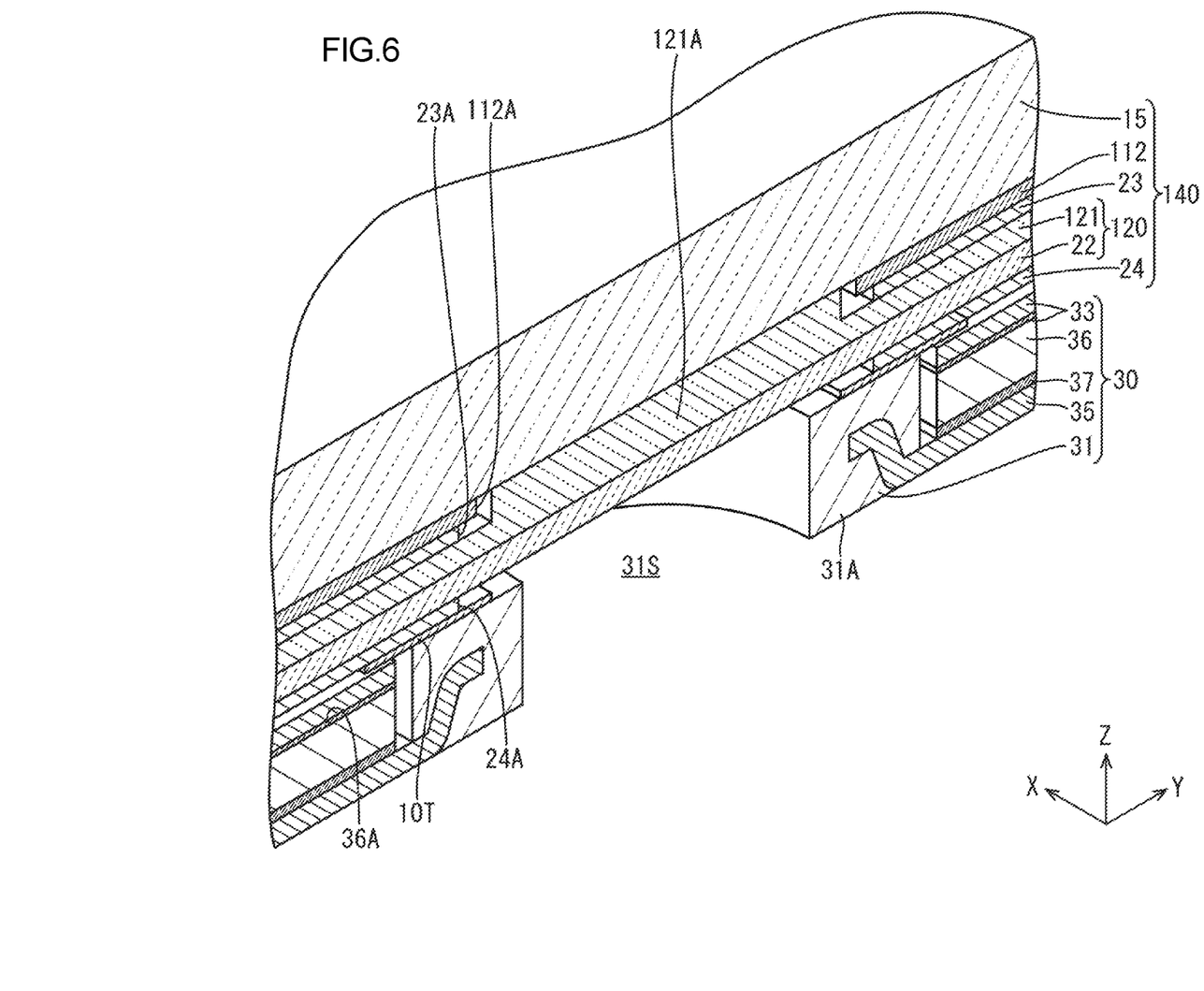
FIG. 6 is a perspective view taken along line II-II in FIG. 1 according to the second embodiment.
Figure 7:
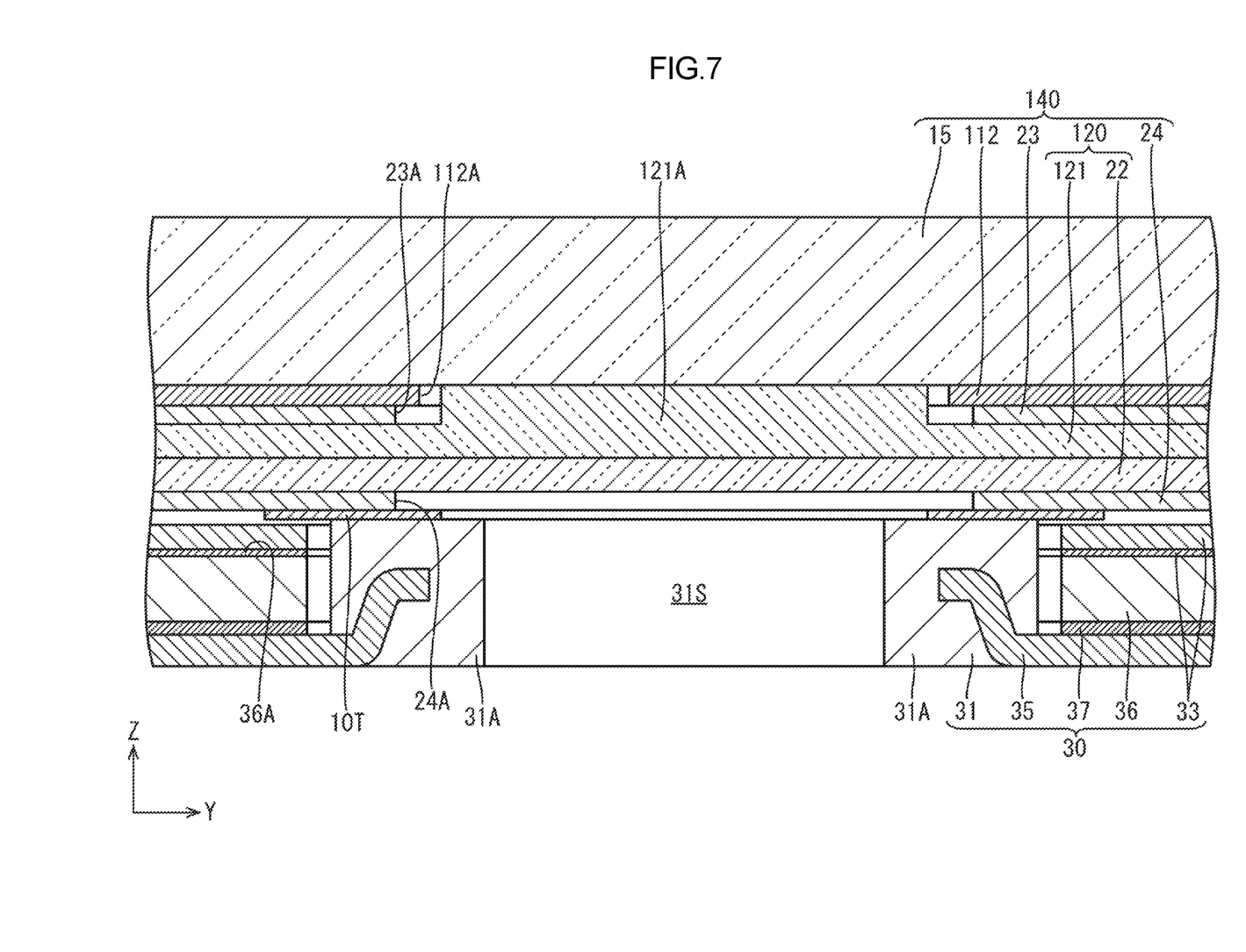
FIG. 7 is a sectional view taken along line II-II in FIG. 1 according to the second embodiment.

FIGS. 6 and 7 in the second embodiment correspond to FIGS. 2 and 3 in the first embodiment. As shown in FIGS. 6 and 7, the liquid crystal assembly 140 includes a second through hole 112A overlapping and communicating with a first through hole 23A of a front polarizing plate 23 in the adhesive member 112 that bonds a cover glass 15 to a front polarizing plate 23. In addition, a first protruding portion 121A of a CF substrate 121 of a liquid crystal panel 120 has a higher height than the first protruding portion 21A according to the first embodiment, and the first protruding portion 121A is inserted into the first through hole 23A and the second through hole 112A.

Assume that the second through hole 112A communicating with the first through hole 23A is provided in the adhesive member 112, and the first protruding portion 121A is not provided. In this case, because the first through hole 23A and the second through hole 112A are filed with air, the air layer reduces the transmittance of light. In this embodiment, the first protruding portion 121A is inserted into the first through hole 23A and the second through hole 112A to cause light passing through the through holes 23A and 112A to be transmitted through the first protruding portion 121A. This makes it possible to suppress a decrease in the transmittance of light due to the air layer and, eventually, to cause light to be properly transmitted through the back side of the liquid crystal assembly 140.

The height of the first protruding portion 121A is equal to the sum of the thickness of the front polarizing plate 23 and the thickness of the adhesive member 112. This makes the height of the first protruding portion 121A equal to the sum of the depth of the first through hole 23A and the depth of the second through hole 112A and causes the first protruding portion 121A to be inserted into the first through hole 23A and the second through hole 112A throughout the total length in the depth direction. Accordingly, light passing through the first through hole 23A and the second through hole 112A need not pass through the air layer. This can reliably suppress a decrease in light transmittance.

Third Embodiment

A liquid crystal assembly 240 according to the third embodiment of the technology described herein will be described with reference to FIGS. 8 and 9. In the third embodiment, a second protruding portion 215A is provided on a cover glass 215. Note that redundant descriptions concerning the same structure, function, and effect as those of the first and second embodiments described above will be omitted.

Figure 8:
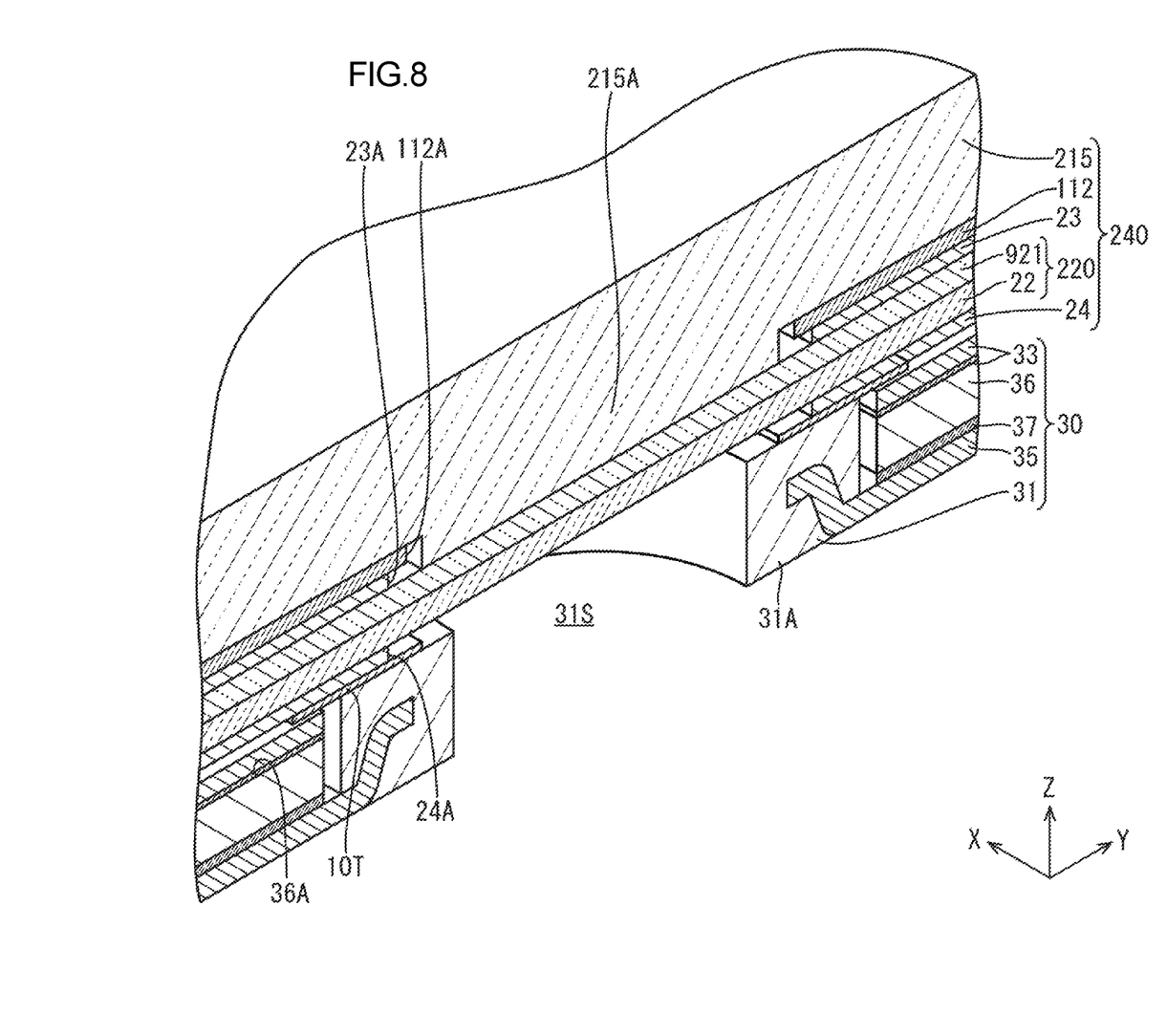
FIG. 8 is a perspective view taken along line II-II in FIG. 1 according to the third embodiment.
Figure 9:
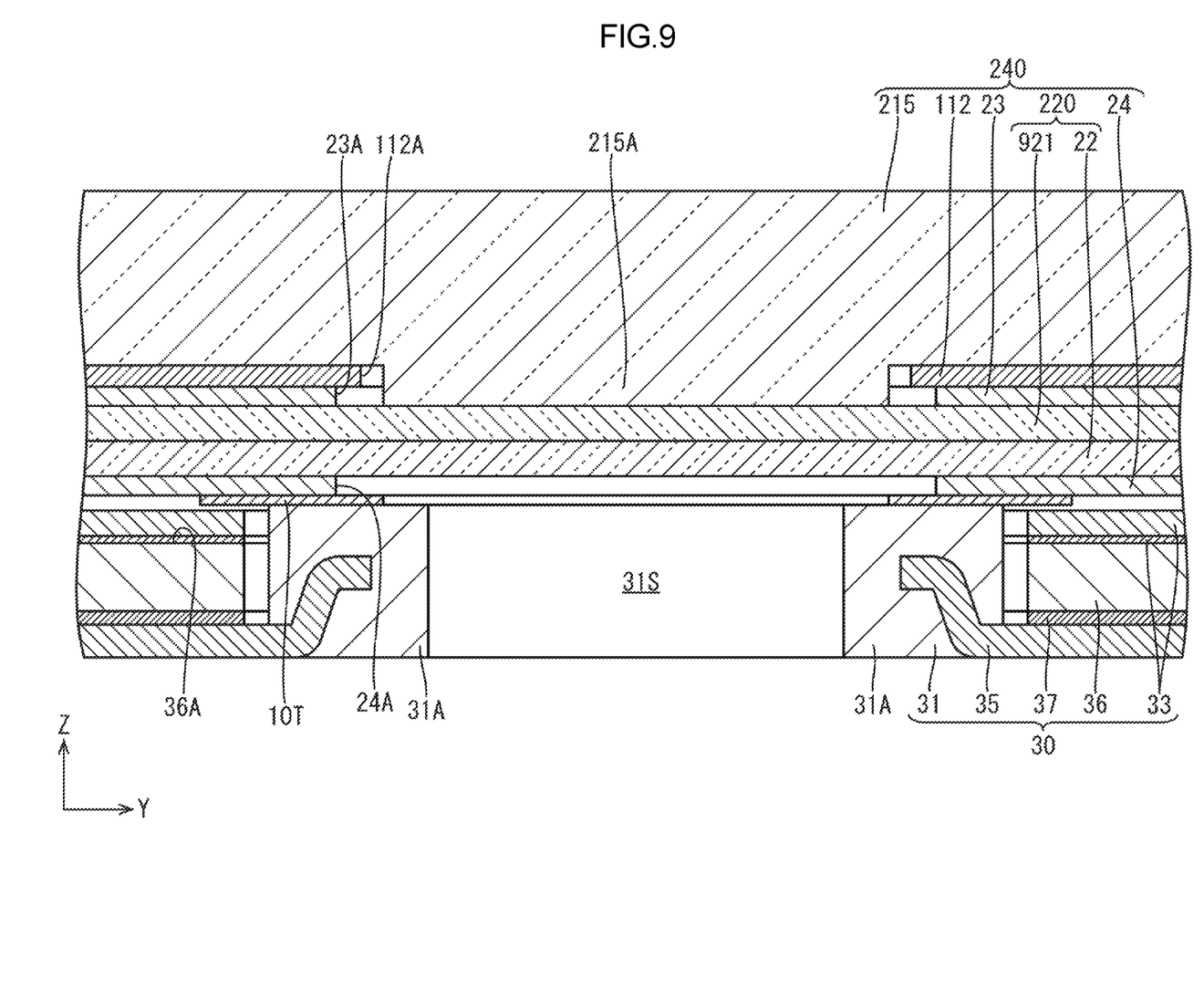
FIG. 9 is a sectional view taken along line II-II in FIG. 1 according to the third embodiment.

FIGS. 8 and 9 in the third embodiment respectively correspond to FIGS. 2 and 3 in the first embodiment. In this embodiment, a cover glass 215 includes the second protruding portion 215A (another example of a protruding portion) having light transmissivity and protruding toward the first through hole 23A. A CF substrate 921 of a liquid crystal panel 220 is not provided with a first protruding portion. As in the second embodiment, an adhesive member 112 includes a second through hole 112A, and the second protruding portion 215A is inserted into the first through hole 23A and the second through hole 112A so as to protrude from them. The liquid crystal assembly 240 according to this embodiment is used for a liquid crystal display device 10 and includes the CF substrate 921, the cover glass 215 that protects the CF substrate 921, and a front polarizing plate 23 disposed between the CF substrate 921 and the cover glass 215 and configured to add a polarizing effect. The front polarizing plate 23 has the first through hole 23A through which light passes toward the back side of the liquid crystal assembly 240. The cover glass 215 includes the second protruding portion 215A having light transmissivity and protruding toward the first through hole 23A.

Providing the second protruding portion 215A on the cover glass 215 causes light transmitted from the outside to the back side of the liquid crystal assembly 240 through the liquid crystal assembly 240 to be transmitted through the second protruding portion 215A in the first through hole 23A and the second through hole 112A. Assume that the second protruding portion 215A is not provided. In this case, because the first through hole 23A and the second through hole 112A are filled with air, the air layer reduces the transmittance of light transmitted through the first through hole 23A and the second through hole 112A. In this embodiment, causing light transmitted through the first through hole 23A and the second through hole 112A to be transmitted through the second protruding portion 215A can suppress a decrease in light transmittance and, eventually, cause light to be properly transmitted through the back side of the liquid crystal assembly 240.

Note that, for the same reason as that for the first protruding portion 121A according to the second embodiment, the height of the second protruding portion 215A is preferably equal to the sum of the depth of the first through hole 23A and the depth of the second through hole 112A, that is, the sum of the thickness of the front polarizing plate 23 and the thickness of the adhesive member 112.

Other Embodiments

The technology described herein is not limited to the embodiments described above with reference to the accompanying drawings. For example, the following embodiments are included in the technical range of the technology described herein.

(1) The first and second embodiments described have exemplified the case in which the first protruding portion is provided, and the third embodiment described above has exemplified the case in which the second protruding portion is provided. However, both the first and second protruding portions may be provided. In this case, the sum of the protrusion heights of the two protruding portions is preferably equal to the sum of the depth of the first through hole and the depth of the second through hole (the sum of the thickness of the front polarizing plate and the thickness of the adhesive member).

(2) Each embodiment described above has exemplified the case in which the backlight device includes the accommodation space for an external component at one position. However, the device may be provided with accommodation spaces at a plurality of positions.

(3) Each embodiment described above has exemplified the case in which the annular member forming the side wall of the hole portion is fixed to the end portion of the frame which is located beside the hole portion. However, the side wall may be integrally formed as part of the frame.

(4) Each embodiment described above has exemplified the edge light type backlight device based on a one-side light entrance type as a backlight device. However, each embodiment may be applied to edge light type backlight devices including direct backlights and edge lit backlights.

(5) Each embodiment described above has exemplified the case in which the liquid crystal display device has a rectangular shape. However, the device may have a non-rectangular shape.

(6) Each embodiment described above has exemplified the case in which the liquid crystal panel with a small screen size. However, each embodiment can be applied to liquid crystal panels with intermediate to large sizes.

The invention claimed is:

1. A display assembly to be used for a display device, the display assembly comprising:
  a substrate;
  a protective member configured to protect the substrate; and
  a first polarizing plate disposed between the substrate and the protective member and configured to add a polarizing effect, wherein
  the first polarizing plate has a first through hole through which light passes toward a back side of the display assembly,
  at least one of the substrate and the protective member includes a base portion having a flat plate shape and a protruding portion having light transmissivity and protruding from the base portion toward the first through hole,
  the protruding portion includes a first surface opposed to a first wall of the first through hole and a second surface opposed to a second wall of the first through hole, the first surface is separated from the first wall with a first space between the first surface and the first wall, and the second surface is separated from the second wall with a second space between the second surface and the second wall.

2. The display assembly according to claim 1, wherein the protruding portion has a height equal to a thickness of the first polarizing plate.

3. The display assembly according to claim 1, further comprising an adhesive member interposed between the protective member and the first polarizing plate and configured to bond the protective member to the first polarizing plate, wherein the adhesive member includes a second through hole overlapping and communicating with the first through hole, and the protruding portion is inserted in the first through hole and the second through hole.

4. The display assembly according to claim 3, wherein the protruding portion has a height equal to a sum of a thickness of the first polarizing plate and a thickness of the adhesive member.

5. The display assembly according to claim 1, further comprising a second polarizing plate disposed on an opposite side of the substrate to the protective member and configured to add a polarizing effect, wherein the second polarizing plate has a third through hole overlapping the first through hole.

6. A display device comprising:

a display assembly according to claim 1; and a lighting device disposed on the back side of the display assembly and configured to irradiate the display assembly with light, wherein the lighting device has an accommodation space configured to accommodate an external component, and the accommodation space is overlapping the first through hole.

7. The display device according to claim 6, wherein the accommodation space is formed from an internal space of a hole portion extending through the lighting device.

8. A display assembly to be used for a display device, the display assembly comprising:

a substrate;

a protective member configured to protect the substrate;

a first polarizing plate disposed between the substrate and the protective member and configured to add a polarizing effect; and an adhesive member interposed between the protective member and the first polarizing plate and configured to bond the protective member to the first polarizing plate, wherein the first polarizing plate has a first through hole through which light passes toward a back side of the display assembly, at least one of the substrate and the protective member includes a protruding portion having light transmissivity and protruding toward the first through hole, the adhesive member includes a second through hole overlapping and communicating with the first through hole, and the protruding portion is inserted in the first through hole and the second through hole.

9. The display assembly according to claim 8, wherein the protruding portion has a height equal to a sum of a thickness of the first polarizing plate and a thickness of the adhesive member.

10. The display assembly according to claim 8, wherein the protruding portion is integrally provided with at least one of the substrate and the protective member.

11. The display assembly according to claim 8, further comprising a second polarizing plate disposed on an opposite side of the substrate to the protective member and configured to add a polarizing effect, wherein the second polarizing plate has a third through hole overlapping the first through hole.

12. A display device comprising:

a display assembly according to claim 8; and a lighting device disposed on the back side of the display assembly and configured to irradiate the display assembly with light, wherein the lighting device has an accommodation space configured to accommodate an external component, and the accommodation space is overlapping the first through hole.

13. The display device according to claim 12, wherein the accommodation space is formed from an internal space of a hole portion extending through the lighting device.

14. A display assembly to be used for a display device, the display assembly comprising:

a substrate;

a protective member configured to protect the substrate;

a first polarizing plate disposed between the substrate and the protective member and configured to add a polarizing effect; and a second polarizing plate disposed on an opposite side of the substrate to the protective member and configured to add a polarizing effect, wherein the first polarizing plate has a first through hole through which light passes toward a back side of the display assembly, at least one of the substrate and the protective member includes a protruding portion having light transmissivity and protruding toward the first through hole, and the second polarizing plate has a third through hole overlapping the first through hole.

15. The display assembly according to claim 14, wherein the protruding portion has a height equal to a thickness of the first polarizing plate.

16. The display assembly according to claim 14, further comprising an adhesive member interposed between the protective member and the first polarizing plate and configured to bond the protective member to the first polarizing plate, wherein the adhesive member includes a second through hole overlapping and communicating with the first through hole, and the protruding portion is inserted in the first through hole and the second through hole.

17. The display assembly according to claim 16, wherein the protruding portion has a height equal to a sum of a thickness of the first polarizing plate and a thickness of the adhesive member.

18. The display assembly according to claim 14, wherein the protruding portion is integrally provided with at least one of the substrate and the protective member.

19. A display device comprising:

a display assembly according to claim 14; and a lighting device disposed on the back side of the display assembly and configured to irradiate the display assembly with light, wherein the lighting device has an accommodation space configured to accommodate an external component, and the accommodation space is overlapping the first through hole.

20. The display device according to claim 19, wherein the accommodation space is formed from an internal space of a hole portion extending through the lighting device.

21. The display assembly according to claim 1, wherein the protruding portion is a portion of the at least one of the substrate and the protective member and does not contact walls of the first polarizing plate opposing the protruding portion.

\* \* \* \* \*